(12) United States Patent
Wu et al.

(10) Patent No.: US 11,715,462 B2
(45) Date of Patent: Aug. 1, 2023

(54) EFFICIENCY ADJUSTABLE SPEECH RECOGNITION SYSTEM

(71) Applicant: MICROSOFT TECHNOLOGY LICENSING, LLC, Redmond, WA (US)

(72) Inventors: Yu Wu, Beijing (CN); Jinyu Li, Bellevue, WA (US); Shujie Liu, Beijing (CN); Xie Chen, Bellevue, WA (US); Chengyi Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 17/244,891

(22) Filed: Apr. 29, 2021

(65) Prior Publication Data

US 2022/0351718 A1  Nov. 3, 2022

(51) Int. Cl.
| | |
|---|---|
| *G10L 15/16* | (2006.01) |
| *G06N 3/08* | (2023.01) |
| *G10L 15/06* | (2013.01) |
| *G10L 15/22* | (2006.01) |
| *G06N 3/044* | (2023.01) |

(52) U.S. Cl.
CPC .............. *G10L 15/16* (2013.01); *G06N 3/044* (2023.01); *G06N 3/08* (2013.01); *G10L 15/063* (2013.01); *G10L 15/22* (2013.01)

(58) Field of Classification Search
CPC ....... G10L 15/16; G10L 15/063; G10L 15/22; G06N 3/044; G06N 3/08
See application file for complete search history.

(56) References Cited

U.S. PATENT DOCUMENTS

| | | |
|---|---|---|
| 10,026,404 B1 | 7/2018 | Wakeford et al. |
| 2016/0086600 A1 | 3/2016 | Bauer et al. |
| 2020/0027444 A1 | 1/2020 | Prabhavalkar et al. |
| 2020/0043468 A1 | 2/2020 | Willett et al. |
| 2020/0335093 A1 | 10/2020 | Senior et al. |
| 2021/0065680 A1 | 3/2021 | Audhkhasi et al. |

(Continued)

OTHER PUBLICATIONS

Gao, et al., "Universal ASR: Unifying Streaming and Non-Streaming ASR Using a Single Encoder-Decoder Model", in Journal of Computing Research Repository (CoRR), Oct. 27, 2020, 5 Pages.

(Continued)

*Primary Examiner* — Mohammad K Islam
(74) *Attorney, Agent, or Firm* — Workman Nydegger

(57) ABSTRACT

A computing system is configured to generate a transformer-transducer-based deep neural network. The transformer-transducer-based deep neural network comprises a transformer encoder network and a transducer predictor network. The transformer encoder network has a plurality of layers, each of which includes a multi-head attention network sublayer and a feed-forward network sublayer. The computing system trains an end-to-end (E2E) automatic speech recognition (ASR) model, using the transformer-transducer-based deep neural network. The E2E ASR model has one or more adjustable hyperparameters that are configured to dynamically adjust an efficiency or a performance of E2E ASR model when the E2E ASR model is deployed onto a device or executed by the device.

20 Claims, 14 Drawing Sheets

(56) References Cited

U.S. PATENT DOCUMENTS

2022/0122590 A1* 4/2022 Haidar .................. G10L 15/063

OTHER PUBLICATIONS

Liu, et al., "Adapting End-to-End Speech Recognition for Readable Subtitles", in Journal of Computing Research Repository (CoRR), May 25, 2020, 10 Pages.

Tsunoo, Emiru, "Towards Online End-to-end Transformer Automatic Speech Recognition", Retrieved From: https://deepai.org/publication/towards-online-end-to-end-transformer-automatic-speech-recognition, Oct. 25, 2019, 5 Pages.

Winata, et al., "Adapt-and- Adjust: Overcoming the Long-Tail Problem of Multilingual Speech Recognition", in Journal of Computing Research Repository (CoRR), Dec. 3, 2020, pp. 1-18.

Yeh, et al., "Transformer-Transducer: End-to-End Speech Recognition With Self-Attention", in Journal of Computing Research Repository (CoRR), Oct. 28, 2019, 5 Pages.

Yu, et al., "Universal Asr: Unify and Improve Streaming ASR With Full-Context Modeling", in Journal of Computing Research Repository (CoRR), Oct. 12, 2020, 12 Pages.

Zhao, et al., "Universal Speech Transformer", in 21st Annual Conference of the International Speech Communication Association, Virtual Event, Shanghai, China, Oct. 25, 2020, 5 Pages.

Chen, et al., "Developing Real-time Streaming Transformer Transducer for Speech Recognition on Large-scale Dataset", in Repository of arXiv:2010.11395v1, Oct. 22, 2020, 5 Pages.

Li, et al., "High-Accuracy and Low-Latency Speech Recognition with Two-Head Contextual Layer Trajectory LSTM Model", in Proceedings of IEEE International Conference on Acoustics, Speech and Signal Processing, May 4, 2020, pp. 7699-7703.

"International Search Report and Written Opinion issued in PCT Application No. PCT/US22/023753", dated Jul. 20, 2022, 17 Pages. (MS#409631-WO-PCT).

Shi, et al., "Dynamic Encoder Transducer: A Flexible Solution for Trading Off Accuracy for Latency", in Repository of arXiv:2104.02176v1, Apr. 5, 2021, 5 Pages.

Tripathi, et al., "Transformer Transducer: One Model Unifying Streaming and Non-streaming Speech Recognition", in Repository of arXiv:2010.03192v1, Oct. 7, 2020, 5 Pages.

Wang, et al., "Low Latency End-to-End Streaming Speech Recognition with a Scout Network", in Repository of arXiv:2003.10369v4, May 3, 2020, 5 Pages.

Wang, et al., "Transformer-based Acoustic Modeling for Hybrid Speech Recognition", in Repository of arXiv:1910.09799v2, Apr. 30, 2020, 5 Pages.

* cited by examiner

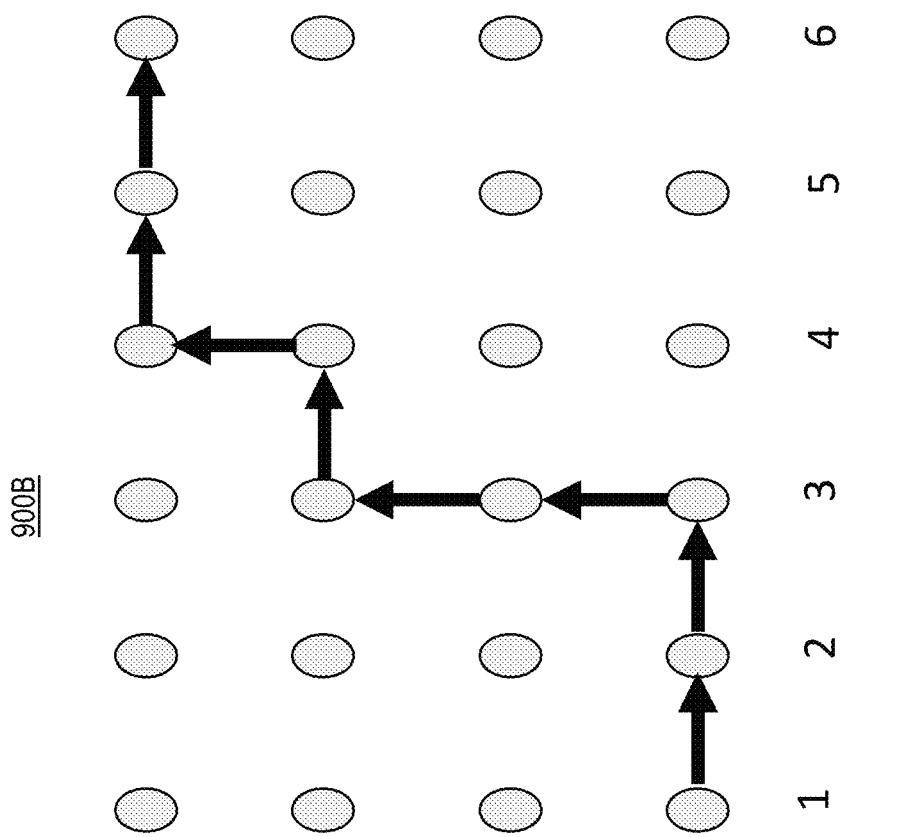

EFFICIENCY ADJUSTABLE SPEECH RECOGNITION SYSTEM

BACKGROUND

Automatic Speech Recognition (ASR) is a technology that uses machine learning to allow human beings to use their voices to speak with a computer interface in a way that resembles normal human conversation. Modern multi-core processors, general-purpose graphical processing units, and other CPU/GPUs continue to increase their computational powers, and more training data for such machine learning is made available through the internet and cloud computing. As such, training of more powerful yet complex machine-learned models is made possible. Furthermore, more and more devices (such as mobile devices, wearable devices, intelligent living room devices, and in-vehicle audio devices) are starting to include one or more ASR systems that employ such models.

There are many different types of ASR systems that provide different services. For example, some ASR systems are speech-to-speech systems configured to translate a speech between different languages in substantially real-time to remove the need for a human interpreter. As another example, some ASR systems are human-to-machine communication systems configured to perform various actions in response to voice commands, such as voice search systems, personal digital assistant systems, gaming systems, living room interaction systems, and in-vehicle infotainment systems.

In many cases, the computation cost of an ASR model increases when the input audio becomes longer. Such an ASR model may require the computing system to be sufficiently powerful to execute the model. Additionally, in many cases, a tradeoff between latency and accuracy is inevitable. Existing ASR systems may train a different model with a different latency for a different scenario, and deploy a particular model onto a particular type of device.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein are related to (1) a computing system configured to use a transformer-transducer-based deep neural network to train an end-to-end (E2E) automatic speech recognition (ASR) model, (2) a device configured to execute the E2E ASR model, and/or (3) a method for dynamically adjusting one or more adjustable hyperparameters of an E2E ASR model based on the computational power of the device.

The computing system is configured to generate a transformer-transducer-based deep neural network. The transformer-transducer-based deep neural network comprises a transformer encoder network and a transducer predictor network. The transformer encoder network has a plurality of transformer layers. Each of the plurality of transformer layers includes a multi-head attention network sublayer and a feed-forward network sublayer. The computing system then trains an E2E ASR model, using the transformer-transducer-based deep neural network and provides the trained E2E ASR model to a device to be used to perform ASR in response to receiving a stream of speech. The E2E ASR model is trained to have one or more adjustable hyperparameters that are configured to dynamically adjust an efficiency or a performance of the E2E ASR model when the E2E ASR model is deployed onto a particular device or executed by the particular device.

In some embodiments, the one or more adjustable hyperparameters includes at least one of (1) a number of layers that are to be implemented at the transformer encoder network, (1) a history window size indicating a number of history frames that are to be considered by a frame in each layer, (3) a look-ahead window size indicating a number of look-ahead frames that are to be considered by a frame in each layer, (4) a chunk size indicating a total number of frames that are to be considered by a frame in each layer, (5) an attention mask indicating particular items in a frame index matrix that are to be set as "0", the frame index representing a particular configuration of the transformer encoder network, and/or (6) a transducer path that is to be executed by the transducer predictor network.

The E2E ASR model is trained in a particular manner based on the transformer-transducer-based deep neural network, such that when the E2E ASR model is deployed onto the device, the E2E ASR model is configured to identify one or more conditions of the device associated with the computational power of the device, and dynamically set at least one of the one or more adjustable hyperparameters of the E2E ASR model based on the identified one or more conditions of the device.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments, which are illustrated in the appended drawings. Understanding that these drawings depict only typical embodiments and are not, therefore, to be considered to be limiting in scope, embodiments will be described and explained with additional specificity and details through the use of the accompanying drawings in which:

FIGS. 9A and 9B illustrate two examples of enumerated paths in the transducer predictor network of an E2E ASR model, where each path may have a different performance;

DETAILED DESCRIPTION

Figure 1A:
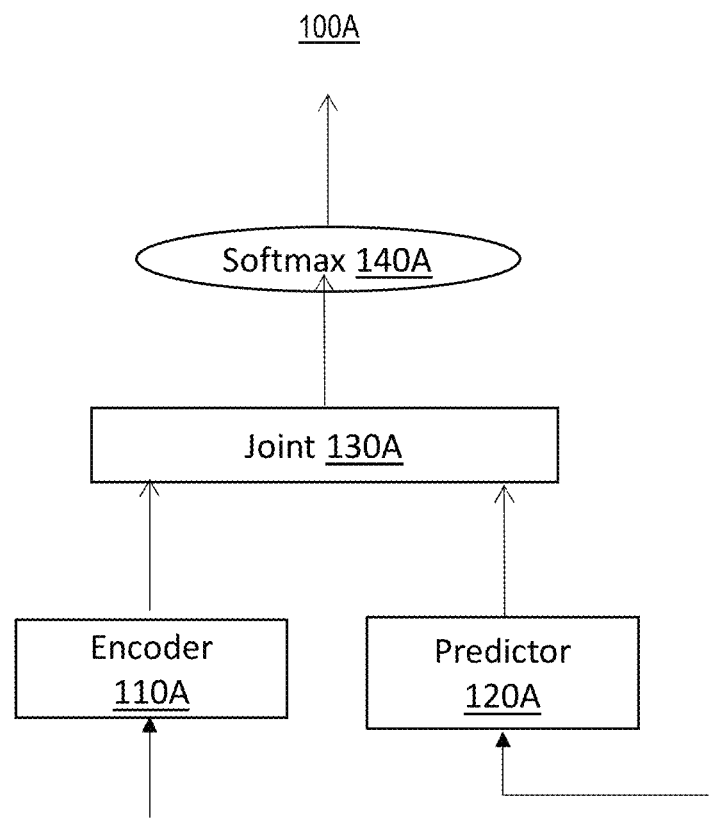
FIG. 1A illustrates an example of a transducer-based neural network architecture.

An end-to-end (E2E) automatic speech recognition (ASR) system is an ASR system configured to translate an input speech sequence into an output token sequence (such as sub-words or words) using a single neural network model without the requirement of a separate language model. Hence, the size of the E2E ASR system is small, and the inference thereof is fast. Further, it is much easier to deploy an E2E ASR system onto a portable device (compared to a traditional hybrid ASR system).

One type of E2E ASR neural network architecture is transformer-based. Unlike recurrent-based E2E ASR architectures, a transformer-based E2E ASR architecture encodes features in parallel and implements a self-attention mechanism that is capable of capturing long dependency between input features. As such, models built by a neural network having a transformer-based E2E ASR architecture generally perform better than models built by a neural network having a recurrent-based E2E ASR architecture.

The principles described herein further include a transducer in a transformer-based E2E ASR system. Such a transformer-transducer-based E2E ASR system shows even better results in streaming scenarios, and is also easy to extend with additional reranking strategies.

However, the computation cost of the transformer-transducer-based E2E ASR system linearly increases as the input audio becomes longer. Moreover, a tradeoff between latency and accuracy is often inevitable in a speech recognition system. One solution for this problem is to build a separate model for each type of device having particular computational power. For example, some of the models are built for having low latency, and these models will only be deployed onto devices with sufficient computational power to achieve a real-time factor (RTF) of less than 1. On the other hand, some of the models are built for having longer latency, and these models will only be deployed onto devices with low computational power. The RTF is the ratio of the speech recognition response time to the utterance duration. Such a solution would use not only exhaustive human efforts but also valuable GPU devices.

The principles described herein solve the above-described problem by training an efficiency and latency adjustable transformer-transducer-based model that is capable of dealing with different applications, latencies, and efficiencies by dynamically changing the inference chunk size and/or encoder layers within a single model.

The computing system is configured to generate a transformer-transducer-based deep neural network. The transformer-transducer-based deep neural network comprises a transformer encoder network and a transducer predictor network. The transformer encoder network has a plurality of transformer layers. Each of the plurality of transformer layers includes a multi-head attention network sublayer and a feed-forward network sublayer. In some embodiments, the plurality of transformer layers are identical layers. In some embodiments, each of the multi-head attention network sublayer and the feed-forward network sublayer further includes a layer configured to perform a residual connection and a layer normalization. In some embodiments, the transducer predictor network includes a plurality of long-short-term memory (LSTM) networks.

The computing system then trains an E2E ASR model, using the transformer-transducer-based deep neural network. The E2E ASR model is trained to have one or more adjustable hyperparameters that are configured to dynamically adjust an efficiency or a performance of the E2E ASR model when the E2E ASR model is deployed onto a particular device or executed by the particular device.

In some embodiments, the one or more adjustable hyperparameters include at least one of (1) a number of layers that are to be implemented at the transformer encoder network, (2) a history window size indicating a number of history frames that are to be considered by a frame in each layer, (3) a look-ahead window size indicating a number of look-ahead frames that are to be considered by a frame in each layer, (4) a chunk size indicating a total number of frames that are to be considered by a frame of a current each layer, (5) an attention mask indicating particular items in a frame index matrix that are to be set as "0", the frame index representing a particular configuration of the transformer encoder network, and/or (6) a transducer path that is to be executed by the transducer predictor network. For example, if chunk size is 3, and each frame is 40 ms long, the frames at 40 ms, 80 ms, and 120 ms are grouped together as a chunk. For the frame at 40 ms (among the three frames at 40 ms, 80 ms, and 120 ms), its lookahead window is 80 ms. Similarly, for the frame at 80 ms or 120 ms (among the three frames at 40 ms, 80 ms, and 120 ms), its lookahead window is 40 ms or 0ms. On the other hand, for the frame at 40 ms (among the three frames at 40 ms, 80 ms, and 120 ms), its history window is 0. Similarly, for the frames at 80 ms or 120 ms (among the three frames at 40 ms, 80 ms, and 120 ms), its history window is 40 ms or 80 ms.

The E2E ASR model is trained in a particular manner based on the transformer-transducer-based deep neural network, such that when the E2E ASR model is deployed onto the device, the E2E ASR model is configured to identify one or more conditions of the device associated with the computational power of the device, and set at least one of the one or more adjustable hyperparameters of the E2E ASR model based on the identified one or more conditions of the device.

In some embodiments, setting the one or more adjustable hyperparameters includes setting a transducer path that is to be executed by the transducer predictor network. In some embodiments, setting the transducer path includes enumerating a plurality of paths in the transducer predictor network. Next, a performance of each of the plurality of paths is determined, and a particular path among the plurality of paths that has a best performance is selected, and the particular path is set as the transducer path that is to be executed by the transducer predictor network.

In some embodiments, setting the one or more adjustable hyperparameters includes setting a maximum chunk size, a maximum history window size, or a maximum look-ahead window size. The attention mask is generated based on the maximum chunk size, the maximum history window size, and/or the maximum look-ahead window size.

In some embodiments, the one or more conditions of the device include one or more hardware conditions, such as (but not limited to) (1) a type of processor that is installed on the device, (2) a number of processors that is installed on the device, (3) a type of memory that is installed on the device, and/or (4) a total amount of memory that is installed on the device. In some embodiments, the one or more conditions of the device include one or more runtime conditions, such as (but not limited to) (1) a function of a particular application that employs the E2E ASR model on the device, and/or (2) a current status of the device. In some embodiments, the function of the particular application that employs the E2E ASR model is (1) a streaming application configured to process a stream of speech in substantially real time, or (2) a post-processing application configured to process a file of a recorded speech. The current status of the device includes at least one of (1) a thermal status of the device, (2) a throttling status of the device, (3) a status of other applications that are currently executing at the device, (4) a battery level of the device, and/or (5) a battery-saving status of the device.

Since the principles described herein are related to a transformer-transducer-based deep neural network, a short introduction to a transducer or a transformer is provided below. A transformer or a transducer is a particular scheme of deep neural network architecture. FIG. 1A illustrates an example of a transducer-based deep neural network architecture 100A. The transducer-based deep neural network architecture 100A includes an encoder network 110A and a predictor network 120A. The output of the encoder network 110A and the output of the predictor network 120A are then joined at a joint network 130A. Finally, the output of the joint network 130A is then sent to a softmax regression unit 140A to generate a prediction and/or a classification result.

As illustrated in FIG. 1A, each of the predictor network 120A and the encoder network 110A is a network that has one or more layers. In some embodiments, the encoder network 110A is a transformer-based encoder network. Such a transducer-based neural network having a transformer-based encoder network is also referred to as a "transformer-transducer-based deep neural network."

Figure 1B:
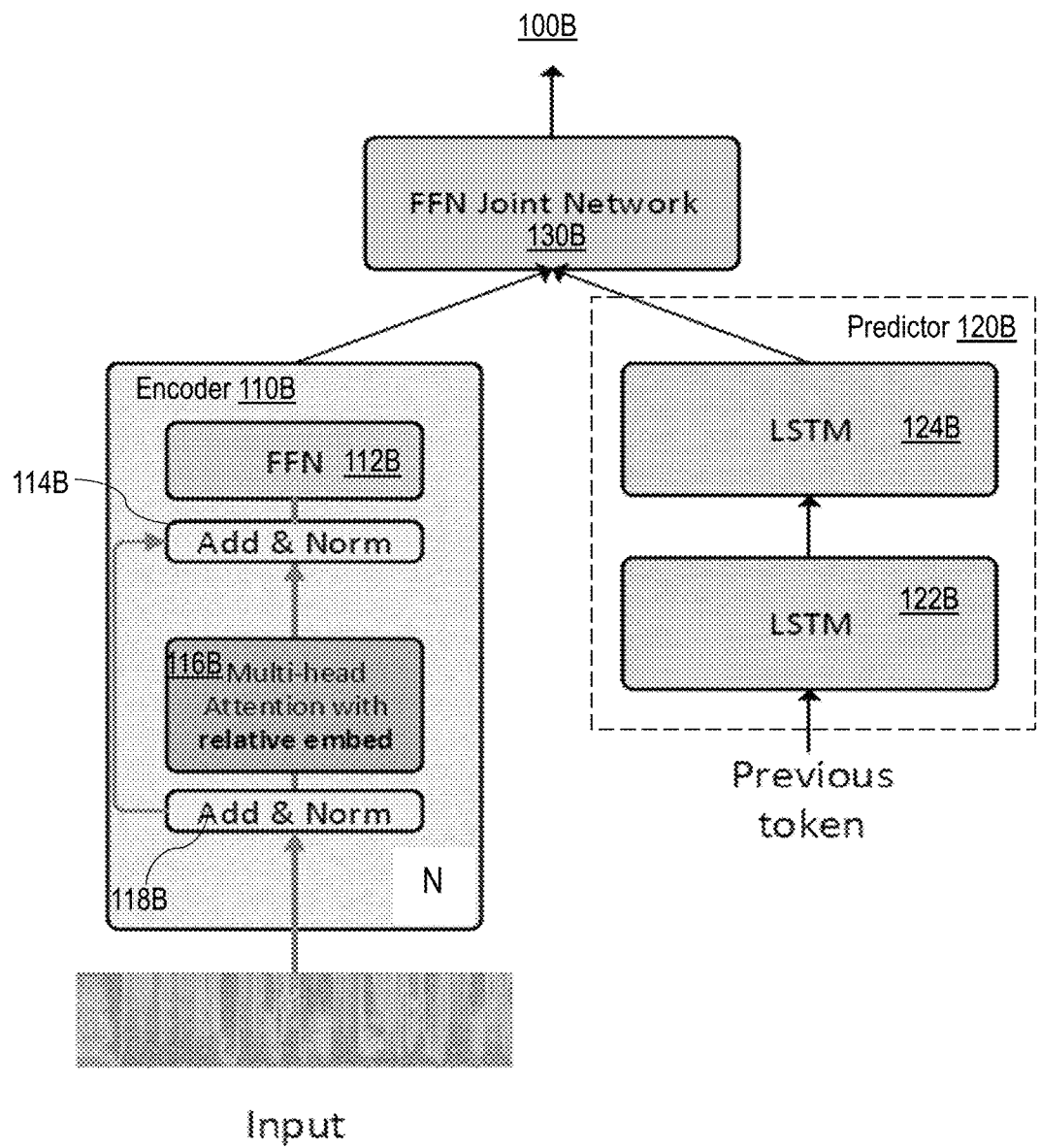
FIG. 1B illustrates an example of a transformer-transducer-based deep neural network architecture for training an E2E ASR model.

FIG. 1B illustrates an example of a transformer-transducer-based deep neural network architecture 100B for training an E2E ASR model. The transformer-transducer-based deep neural network architecture 100B includes a transformer encoder network 110B, a transducer predictor network 120B, and a feed-forward network (FFN) joint network 130B. The transformer encoder network 110B corresponds to the encoder network 110A of FIG. 1A, the predictor 120B corresponds to the predictor network 120A of FIG. 1A, and the FFN joint network 130B corresponds to the joint network 130A of FIG. 1A.

The transformer encoder network 110B includes a stack of multiple (N) transformer layers, each of which has two sublayers, namely (1) a multi-head self-attention network sublayer 116B and (2) a feed-forward network (FFN) sublayer 112B. Further, an "add & norm" layer 114B, 118B is employed in both sublayers. The "add & norm" layer 114B, 118B is a layer configured to perform a residual connection followed by a layer normalization. Further, the multi-head self-attention network 116B is a type of recurrent neural network. The FFN 112B is configured to transform the representation of all the sequences using a same multi-layer perceptron (MLP). In the feed-forward network, queries, keys, and values are from the output of the previous encoder layer. As a result, the transformer encoder network 110B outputs a multi-dimensional vector representation for each position of the input sequence.

For example, given an input X, including a plurality of frames, the input X first goes through residual connection and layer normalization via the "add & norm" layer 118B to generate another plurality of frames. The resulting plurality of frames (generated by the "add & norm" layer 118B) is then sent to the multi-head self-attention network sublayer 116B. The multi-head self-attention network sublayer 116B is configured to perform a linear transformation to the result of the "add & norm" layer 118B. Based on the result of the linear transformation, the sublayer 112B then computes an attention weight for each frame. Based on the attention weights, the sublayer 116B then generates a linear combination value for each frame, applying the attention weights to the values of the respective frames. The linear combination values of the plurality of frames then go through residual connection and layer normalization via the "add & norm" layer 114B. The resulting plurality of frames (generated by the "add & norm" layer 114B) is then sent to the FFN 112B, which also generates a result of a plurality of frames.

The resulting plurality of frames (generated by the FFN 112*b*) is then processed by a second transformer network 110B. For example, the resulting plurality of frames (generated by the FFN 112B) goes through the "add & norm" layer 118B, the result of which is then processed by the multi-head self-attention network sublayer 116B, the result of which is then processed by the "add & norm" layer 114B, and the result of which is then processed by the FFN 112B. This process repeats for N times (e.g., N=18) during the training process.

The transducer predictor network 120B also includes a stack of one or more layers, each of which is a Long-Short-Term Memory (LSTM) network. An LSTM network is a type of recurrent neural network configured to address long-term information preservation and short-term input skipping in latent variable models. In some embodiment, an LSTM network includes two dedicated gates. One gate is configured to govern how much new data is taken into account, and the other gate is configured to govern how much of the old memory cell content is retained.

As illustrated in FIG. 1B, in some embodiments, two LSTM network layers 122B and 124B are implemented. In the first LSTM network 122B, the queries, keys, and values are from the previous tokens. In the second LSTM network 124B, the queries, keys, and values are from the output of the first LSTM network 122B. The output of the transformer encoder network 110B and the output of the transducer predictor network 120B are then sent to the FFN joint network layer 130B. In the FFN joint network 130B, queries are from the outputs of the transducer predictor network 120B, and the keys and values are from the outputs of the transformer encoder network 110B.

Existing technologies only consider a number of acoustic frames T in determining a batch size. However, during the transformer-transducer training, the consumed memory relies on a length of acoustic frames T and sentence pieces U. In particular, the memory consumed on the transformer encoder network 110B is based on a batch size B and a number of acoustic frames T; the memory consumed on the predictor 110A is based on the batch size B and a number of sentence pieces U; and the memory consumed on the joint network 130B is based on a matrix multiplication in the output layer: (B, T, U, V).

In some embodiments, an improved batching is implemented. The improved batching is based on $T*U$ or $\alpha*T+\beta*T*U$, where $\alpha$ and $\beta$ are estimated by solving pseudo inverse, given the consumed memory, and B, T, and U. Based on the experiments conducted by the inventors, batching based on $T*U$ speeds up the training by about 1.25 times, and batching based on $\alpha*T+\beta*T*U$ speeds up the training by about 1.5 times, compared to the traditional batching based on T.

In some embodiments, half-precision floating-point format (FP16) with multiple nodes parallel training is performed. In some embodiments, an O2 optimization level is used. Based on the experiments conducted by the inventors, the FP16 training using an O2 optimization level improves both memory and training speed, while achieving a same convergence without or with little performance loss (compared to FP32 training). In particular, batching based on $\alpha*T+\beta*T*U$ and FP16 speeds up training by about 2.6 times (compared to batching based on T and FP32 training).

Once the ASR model is trained, the number of layers of the transformer encoder network 1101B in the trained ASR model that is to be used to encode a received input is adjustable depending on the circumstances, such as the computational power of the device. In other words, the number of layers of the transformer encoder network 110B of the trained ASR model is an adjustable hyperparameter. In some embodiments, other than the number of layers in the transformer encoder network 110B of a trained ASR model, other hyperparameters are also adjustable based on the computational power of the device and/or the current physical conditions of the device. Such adjustable hyperparameters include (but are not limited to) (1) whether the transformer is with a history and/or a size of a history window, (2) whether the transformer is with a look ahead and/or a size of a look-ahead window, (3) a chunk size of the transformer encoder network, (4) a shape and size of an attention mask that is to be applied onto a frame index matrix corresponding to the transformer encoder network, and/or (5) a transducer path of the transducer predictor network.

Figures 2A, 2B:
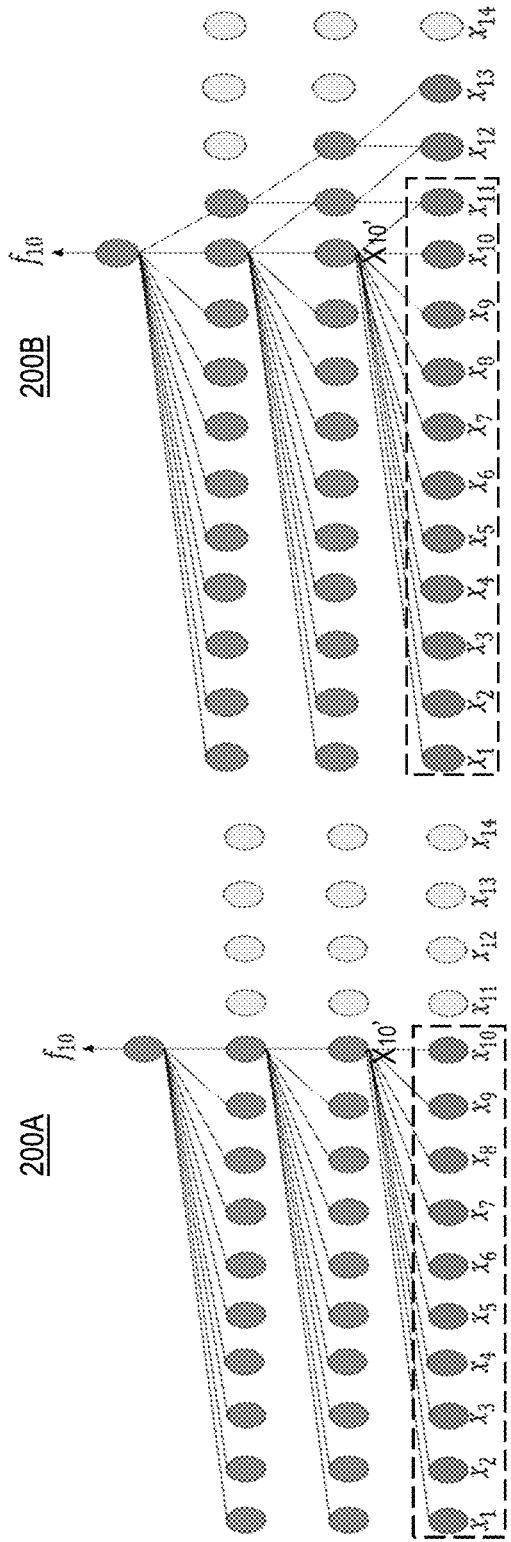
FIG. 2A illustrates an example of a partial transformer encoder network configuration of an E2E ASR model with a full history, but without a look ahead.
FIG. 2B illustrates an example of a partial transformer encoder network configuration of an E2E ASR model with a full history and a look ahead window size 1.

FIGS. 2A and 2B illustrate the concepts of history and look ahead in a transformer encoder network of an E2E ASR model. For clarity, in each of FIGS. 2A and 2B, only the input and output connections associated with the $10^{th}$ frame in each layer are shown. Referring to FIG. 2A, a transformer encoder network configuration 200A is with a full history, because the $10^{th}$ frame x10' in the second layer receives input from each of the historical inputs x1 through x9, and the same pattern repeats in a next layer, and so on and so forth. Notably, in FIG. 2A, the transformer encoder network configuration 200A does not include a look ahead. Referring to FIG. 2B, a transform encoder network configuration 200B not only includes a full history, but also includes a look ahead with a window size of 1, because frame x10' not only receives input from each of the historical frame or input x1 through x10, but also receives a following frame or input (i.e., a look ahead input) from x11, and this pattern also repeats in a next layer, and so on and so forth.

A total number of frames that are directly connected to a higher frame in the next level in the deep neural network is called a "chunk size." For example, the chunk size of the transformer encoder network configuration 200A is 10, and the chunk size of the transformer encoder 200B is 11. As shown in FIGS. 2A-2B, when the chunk size, the history window size, and/or the look-ahead window size increases, the memory and runtime cost increase significantly.

The E2E ASR model described herein is built in such a way, the chunk size, the history window size, and/or the look-head window size of the transformer encoder network are adjustable depending on the computational power of the device, the current status of the device and/or the application. FIGS. 3A-3B, 4A-4B, 5A-5B, 6A-6B, and 7A-7B illustrate examples of configurations of the E2E ASR model having different chunk sizes, history window sizes, and/or look-ahead window sizes.

Figure 3B:
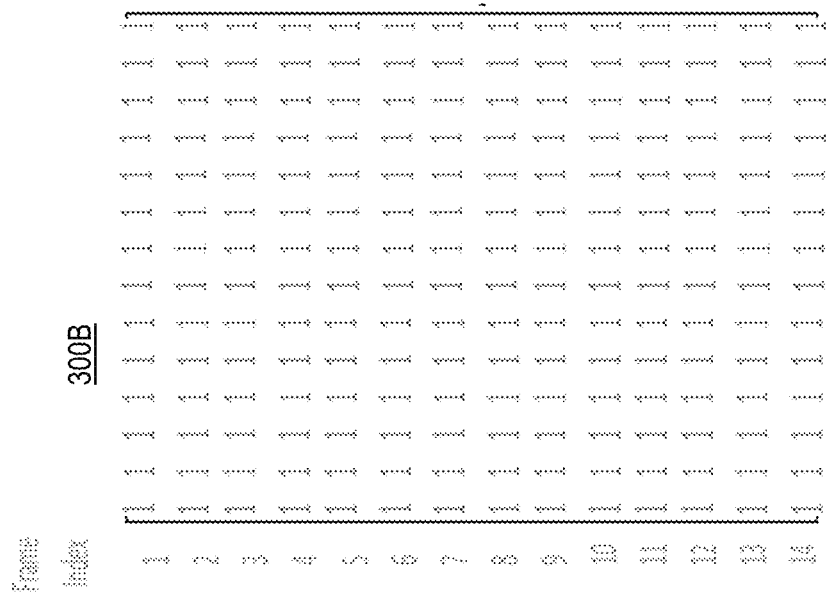
FIG. 3B illustrates a frame index matrix corresponding to the transformer encoder network configuration of FIG. 3A.
Figure 3A:
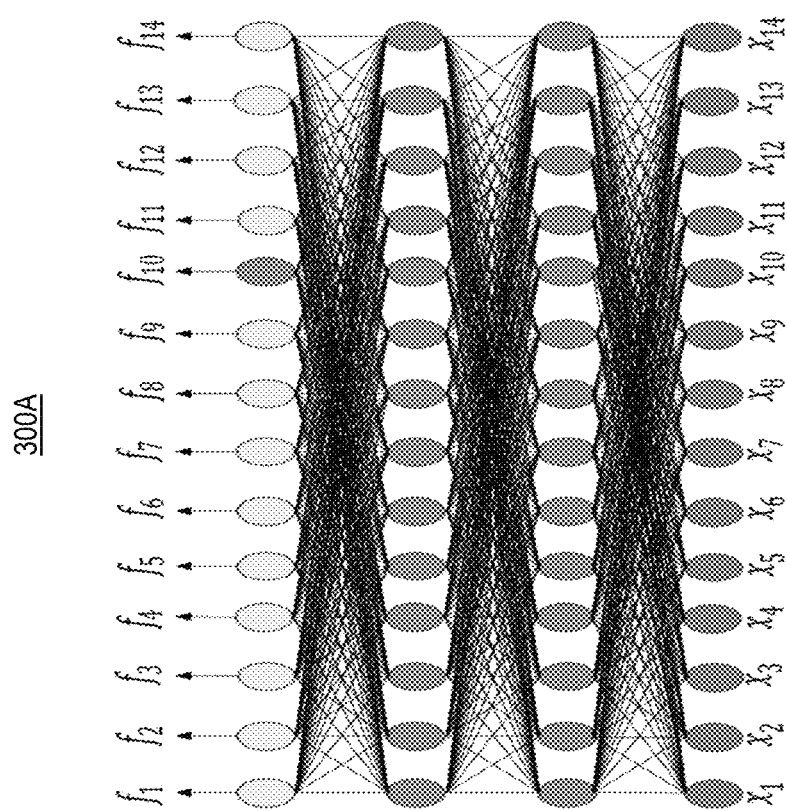
FIG. 3A illustrates an example of a transformer encoder network configuration of an E2E ASR model with a full history and a full look ahead.

FIGS. 3A and 3B further illustrate an example of a transformer encoder network configuration 300A and a corresponding frame index matrix 300B. The transformer encoder configuration 300A is with a full history, and a full look ahead, which means every frame of x1 through x14 is considered by each frame in a next layer, and similarly, every frame in the next layer is considered by its next layer, and so on and so forth. Such a full history and full look ahead configuration may also be presented in the frame index matrix 300B in FIG. 3B. As shown in FIG. 3B, the whole matrix is filled with binary ones ("1"), with no binary zeros ("0") at all. As such, the transformer encoder configuration 300A requires the whole utterance, and such a configuration 300A is more desirable for a post-processing application, but not a real-time-processing application, although the configuration 300A is likely to provide accurate performance. When a user inputs a previously recorded speech into a post-processing application, and the user's device has sufficient computational power, such a configuration is likely to be implemented. However, when an application requires processing streams of speech data in substantially real time or the device's computational power is insufficient, such a configuration would not be proper.

Figure 4B:
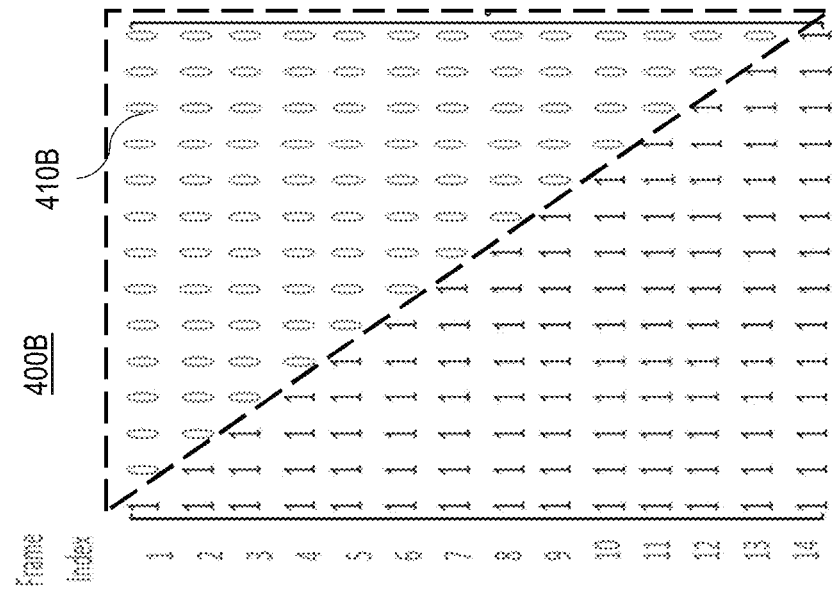
FIG. 4B illustrates a frame index matrix corresponding to the transformer encoder network of FIG. 4A.
Figure 4A:
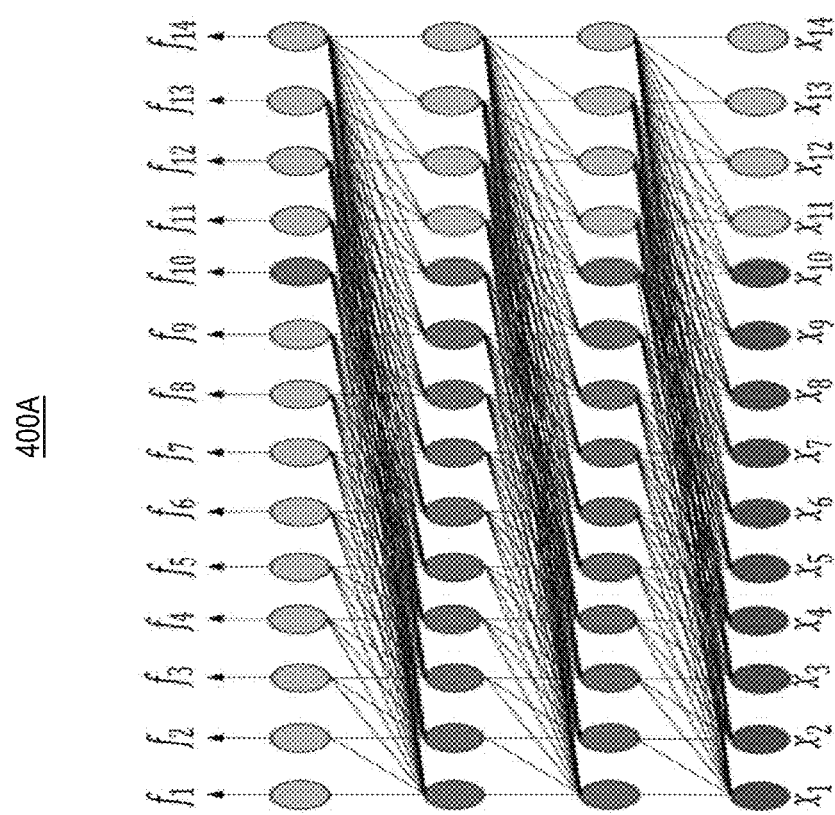
FIG. 4A illustrates another example of a transformer encoder network configuration of an E2E ASR model with a full history, but without a look ahead.

FIGS. 4A and 4B illustrate another example of a transformer encoder configuration 400A and a corresponding frame index matrix 400B. The transformer encoder configuration 400A has a chunk size 14, a maximum history window size 13, and a look ahead window size 0. Similar to the transformer encoder configuration 300A, the transformer encoder configuration 400A can also be represented by a frame index matrix 400B. As illustrated in FIG. 4B, along a diagonal line, a lower-left half of the matrix 400B is filled with 1's, and an upper-right half of the matrix 400B is filled with 0's. The portion of the matrix that is filled with "0" is like placing a triangle-shaped mask over the matrix 400B (having all the "1"). Such a mask is also referred to as an "attention mask." In some embodiments, when configuring the transformer encoder, the system may simply configure an attention mask (having a particular shape and/or size) for the frame index matrix, which takes into account the chunk size, the history window size, and/or the look-ahead window size. Since this configuration has no look ahead, it can be implemented in a real-time processing application. However, since this configuration of FIGS. 4A and 4B is with the full history, it would require fairly high computational power. Only when the device has sufficient computational power, such a configuration should be implemented.

Figure 5B:
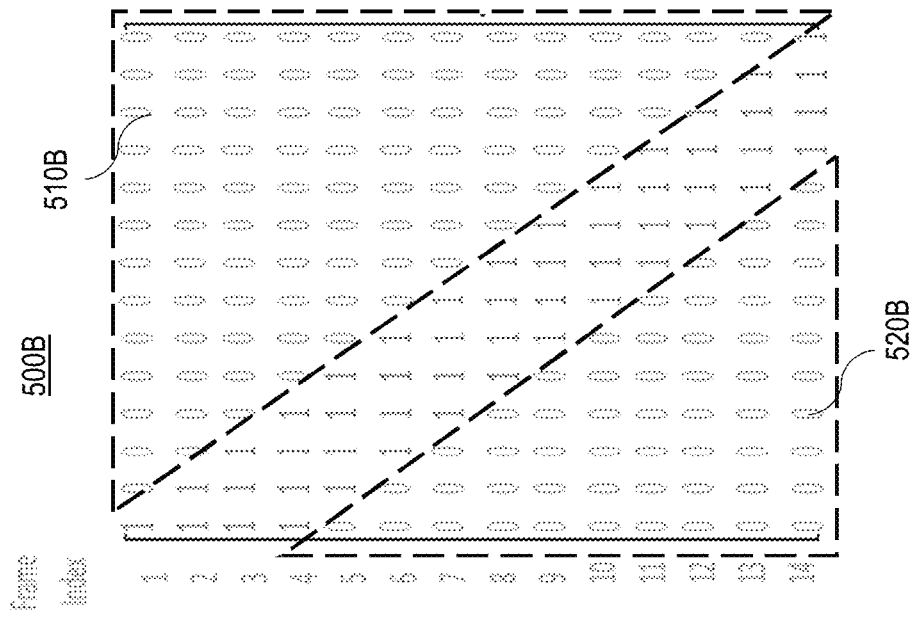
FIG. 5B illustrates a frame index matrix corresponding to the transformer encoder network of FIG. 5A.
Figure 5A:
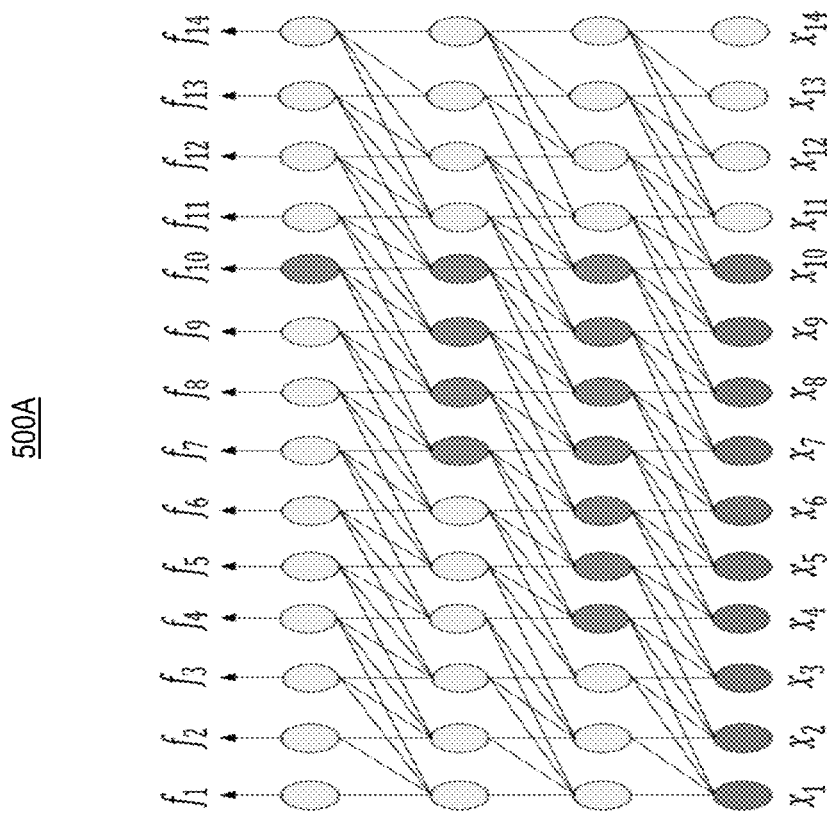
FIG. 5A illustrates another example of a transformer encoder network configuration of an E2E ASR model with a history window size 3, but without a look ahead.

FIGS. 5A and 5B illustrate another example of a transformer encoder configuration 500A and a corresponding frame index matrix 500B. The transformer encoder configuration 500A has a chunk size 4, a history window size 3, and a look ahead window size 0. Again, the transformer encoder configuration 500A can also be presented by a frame index matrix 500B having an attention mask 510B, 520B. As illustrated in FIG. 5B, here, the attention mask has two triangular pieces 510B and 520B. Further, compared to the configuration of FIGS. 4A and 4B, the configuration of FIGS. 5A and 5B requires much less computational power, because much fewer frames and nodes are interconnected with each other.

Figures 6A, 6B:
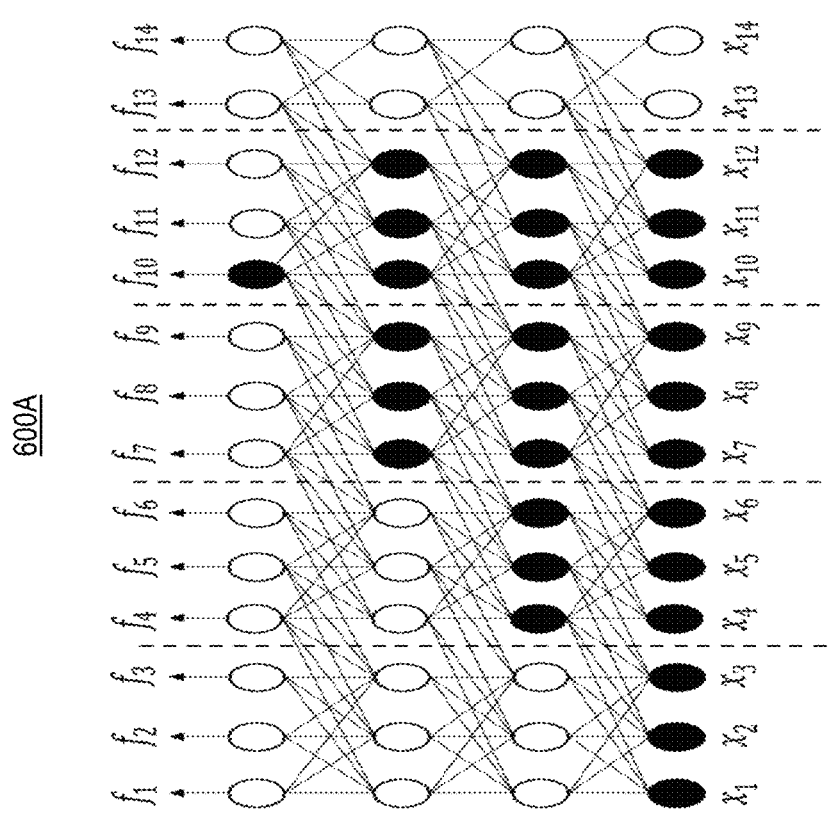
FIG. 6A illustrates another example of a transformer encoder network configuration of an E2E ASR model with a maximum window size 3, a maximum look-ahead window size 2, and a maximum chunk size 6.
FIG. 6B illustrates a frame index matrix corresponding to the transformer encoder network of FIG. 6A.

In some embodiments, the chunk size, the history window size, and/or the look-ahead window size may not be the same size for each frame as those in FIGS. 5A and 5B. FIGS. 6A and 6B illustrate another example of a transformer encoder configuration 600A and a corresponding frame index matrix 600B. The transformer encoder configuration 600A has a maximum chunk size 5, a maximum history window size 3, and a maximum look-ahead window size 1. However, not every frame is with the maximum chunk size 5, the maximum history window 3, and/or the maximum look-ahead window size 1. Again, the transformer encoder configuration 500A can also be represented by a frame index matrix 600B having an attention mask. As illustrated in FIG. 6B, here, the attention mask has multiple rectangular pieces 510B, 520B, 530B, 540B, 550B, 560B, and 570B.

Figures 7A, 7B:
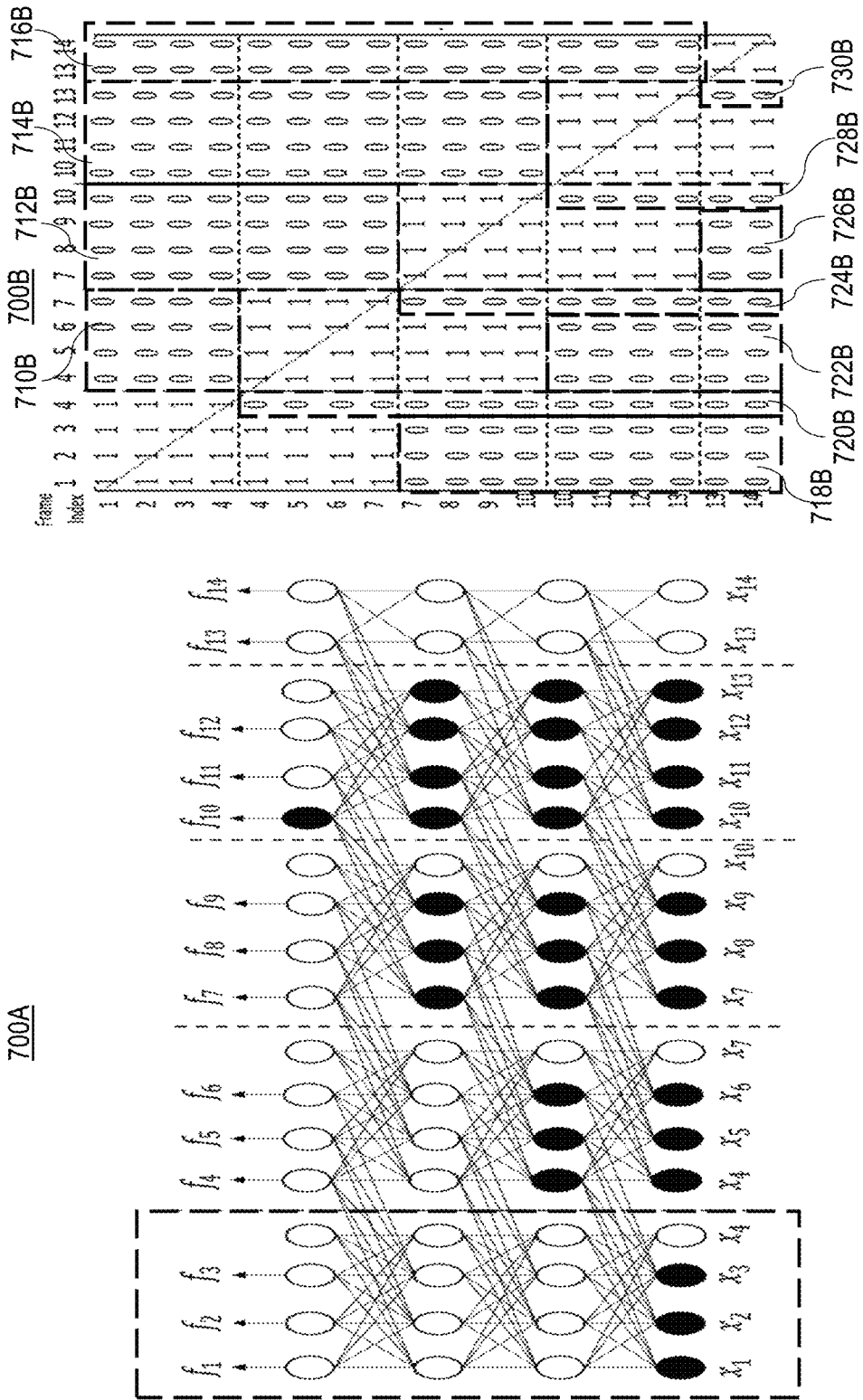
FIGS. 7A and 7B illustrate another example of a transformer encoder network configuration and a corresponding frame index matrix.

In some embodiments, the different pieces of the masks are not necessarily interconnected with each other. FIGS. 7A and 7B illustrate another example of a transformer encoder configuration 700A and a corresponding frame index matrix 700B. The transformer encoder configuration 700A has a maximum chunk size 5, a maximum history window size 4, and a maximum look-ahead window size 3. As illustrated, the frame index matrix 700B and its attention mask here are even more complicated. The attention mask includes multiple pieces 710B, 712B, 714B, 716B, 718B, 720B, 722B, 724B, 728B, and 730B. Some of these pieces (e.g., 724B, 728B, 730B) of the attention mask are isolated pieces. In other words, they are not necessarily connected to the other piece of the attention mask.

FIGS. 3A-3B, 4A-4B, 5A-5B, 6A-6B, and 7A-8B are merely a few examples of transformer encoder network configurations that may be implemented based on the computational power of a device, the current status of the device, and/or a particular application (e.g., a post-processing application, or a streaming application). There are a large number of configurations and/or attention masks that may be selected based on the device and the circumstances. In some embodiments, based on the circumstances, a maximum chunk size, a maximum history window size, and/or a maximum look-ahead window size are determined. Based on the determined maximum chunk size, history window size, and/or look-ahead window size, an attention mask is then determined. In some embodiments, a plurality of attention masks having the maximum chunk size, history window size, and/or look-ahead window size are enumerated. For each of the plurality of attention masks, a performance is estimated. Based on the estimated performance, a particular attention mask among the plurality of attention masks is then selected.

Figure 8:
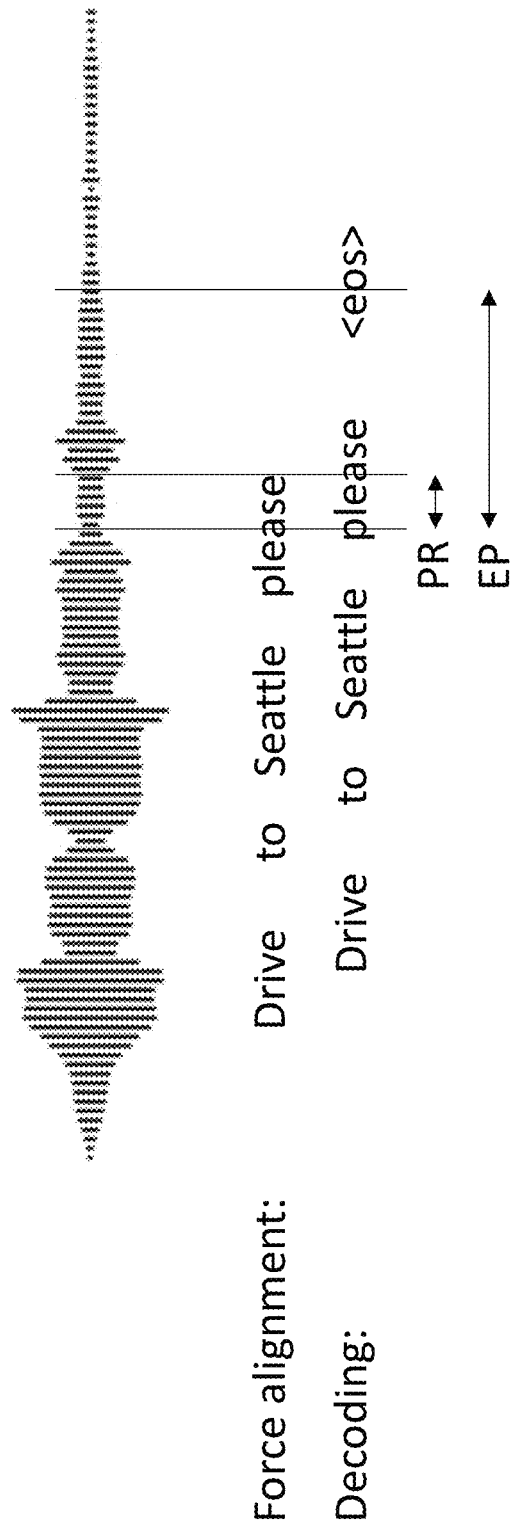
FIG. 8 illustrates concepts of a partial recognition latency and an end-pointer latency that may be used to measure the performance of a transducer predictor network of an E2E ASR model.

Further, as briefly discussed above, the transducer predictor network includes one or more LSTM networks, which has a latency depending on which path it takes to process the acoustic frames T. Various metrics may be used to evaluate a latency of a transducer predictor network. Commonly used metrics include (1) a partial recognition (PR) latency, and (2) an end-pointer (EP) latency. Referring to FIG. 8, the PR latency is an offset between a time when the ground truth last word was received and a time when the last word is decoded. The EP latency is an offset between ground truth last word and an <eos> token at the end of a sequence. In some embodiments, the PR latency and/or the EP latency are measured or estimated. Based on the measured or estimated PR latency and/or the EP latency, the transformer encoder is configured in a particular manner or reconfigured to increase or decrease the PR latency and/or the EP latency.

Figure 9A:
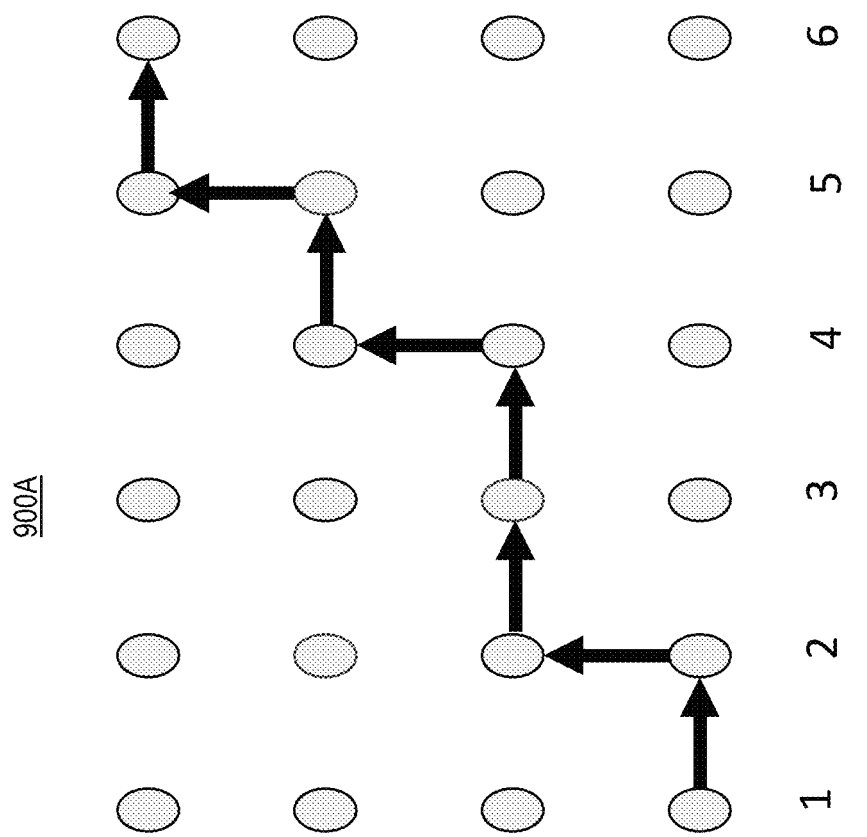

In some embodiments, multiple paths in the transducer predictor network 120B are enumerated. For each of the multiple paths, a performance (e.g., an PR, and/or an EP) is estimated. A particular path among the multiple paths that have a best performance is selected to be applied by the transducer predictor network 120B. FIGS. 9A and 9B illustrate two examples of enumerated paths 900A and 900B. As illustrated, path 900B may be faster than path 900A. Thus, path 900B will be selected to be applied by the transducer predictor network.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
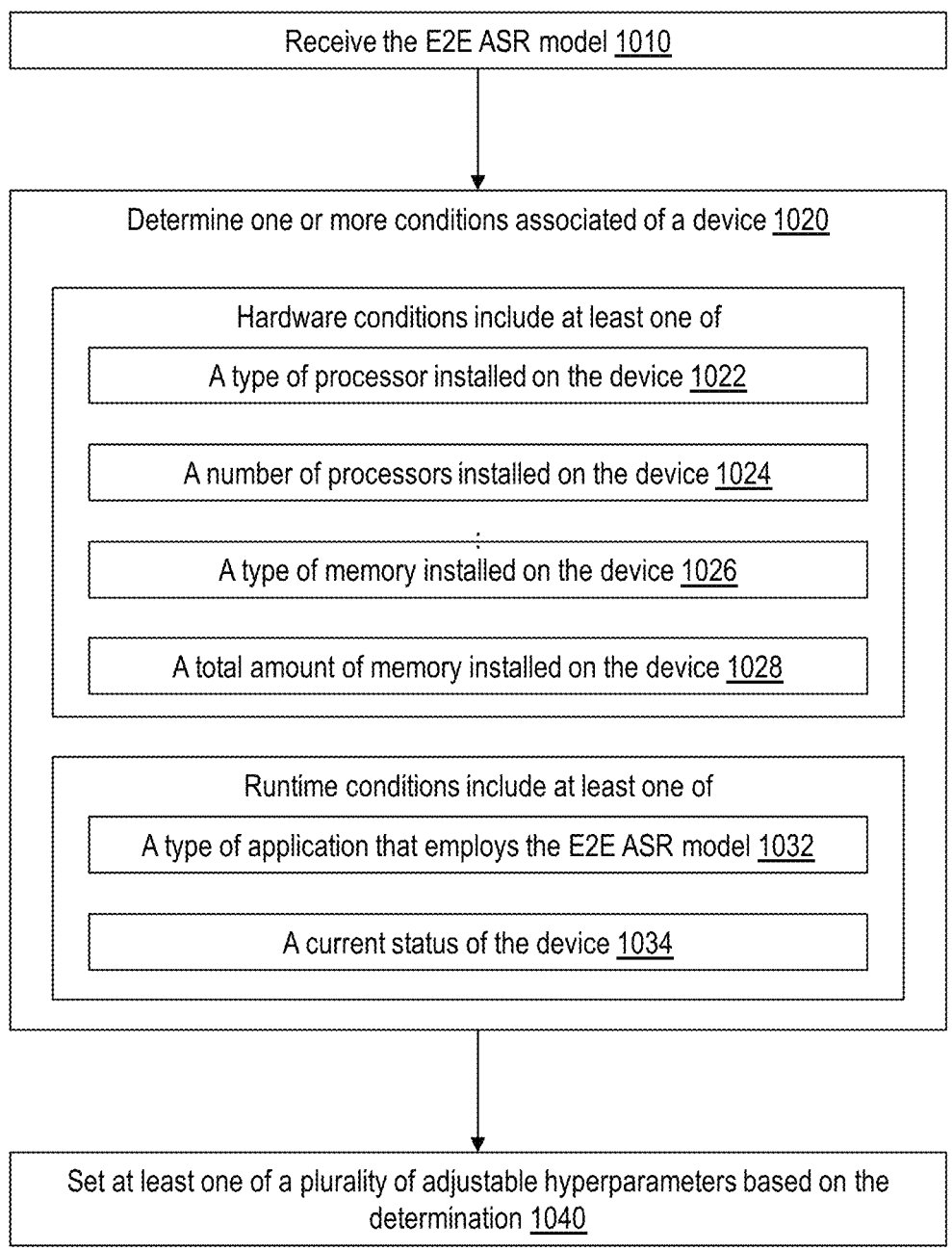
FIG. 10 illustrates a flowchart of an example of a method for dynamically adjusting one or more hyperparameters of an E2E ASR model based on one or more conditions of a device.

FIG. 10 illustrates a flowchart of an example method 1000 for dynamically adjusting an ARS system based on one or more conditions of a device. In some embodiments, the method 1000 includes receiving an E2E ASR model trained using a transformer-transducer-based deep neural network (act 1010). The method 1000 also includes determining one or more conditions of the device associated with computational power of the device (act 1020). In some embodiments, one or more conditions include hardware conditions, such as (1) a type of processor installed on the device (1022), (2) a number of processors installed on the device (1024), (3) a type of memory installed on the device (1026), and/or (4) a total amount of memory installed on the device (1028). In some embodiments, one or more conditions include one or more runtime conditions, such as (1) a type of application that employs the E2E ASR model (1032) and/or (2) a current status of the device (1034).

For example, the type of application that employs the E2E ASR model may be (but are not limited to) a post-processing application or a real-time streaming application. As another example, the current status of the device may be (but are not limited to) (1) a thermal status of the device, (2) a throttling status of the device, (3) a status of other applications that are currently executing at the device, (4) a battery level of the device, or (5) a battery-saving status of the device.

The method 1000 further includes setting at least one of one or more adjustable hyperparameters based on the determination (act 1040). The one or more hyperparameters may include (but are not limited to): (1) a number of layers that are to be implemented at the transformer encoder network, (1) a history window size indicating a number of history frames that is to be considered by a frame in each layer, (3) a look-ahead window size indicating a number of look-ahead frames that is to be considered by a frame of each layer, (4) a chunk size indicating a total number of frames that is to be considered by a frame of each layer, (5) an attention mask indicating particular items in a frame index matrix that are to be set as "0", the frame index representing a particular configuration of the transformer encoder network, and/or (6) a transducer path that is to be executed by the transducer predictor network.

Figure 11:
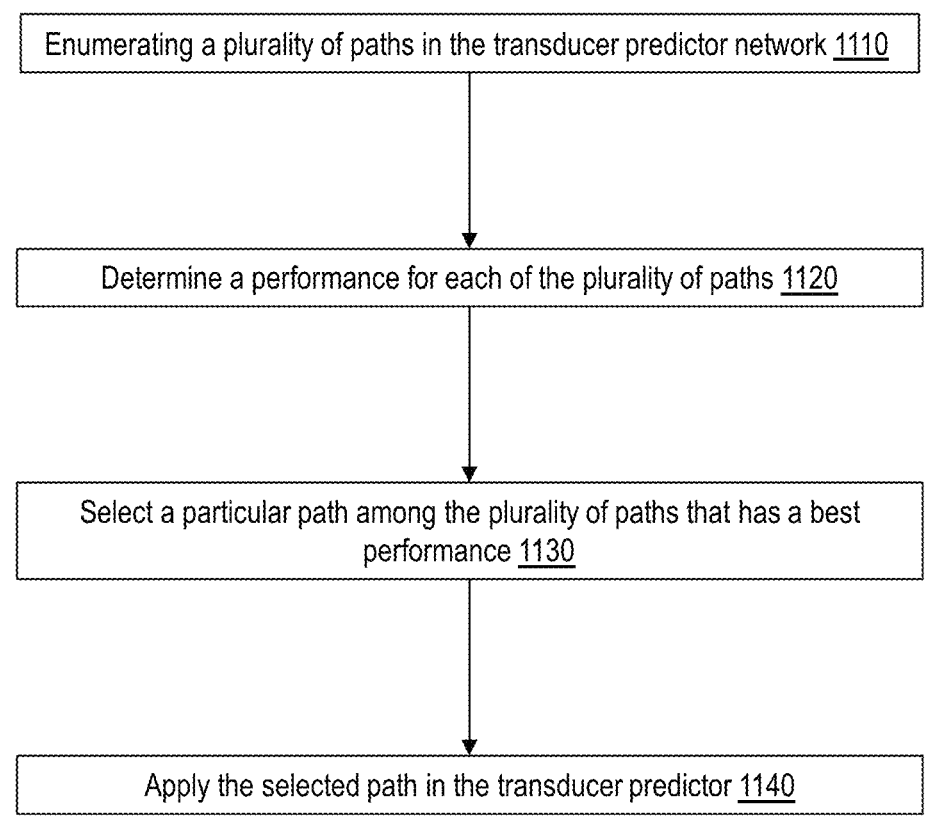
FIG. 11 illustrates a flowchart of an example of a method for dynamically selecting a transducer path for the transducer predictor network of an E2E ASR model.

FIG. 11 illustrates a flowchart of an example of method 1100 for selecting a path for a transducer predictor network 120B of an E2E ASR model. The method 1100 includes enumerating a plurality of paths in the transducer predictor network (act 1110). The method 1100 also includes determining performance of each of the plurality of paths (act 1120). The method 1100 also includes selecting a particular path among the plurality of paths that has a best performance (act 1130) and applying the particular path in the transducer predictor network (act 1140).

Finally, because the principles described herein may be performed in the context of a computing system (for example, the training of the E2E ASR model is performed by one or more computing systems, and the E2E ASR model is deployed onto one or more computing systems) some introductory discussion of a computing system will be described with respect to FIG. 12.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 12:
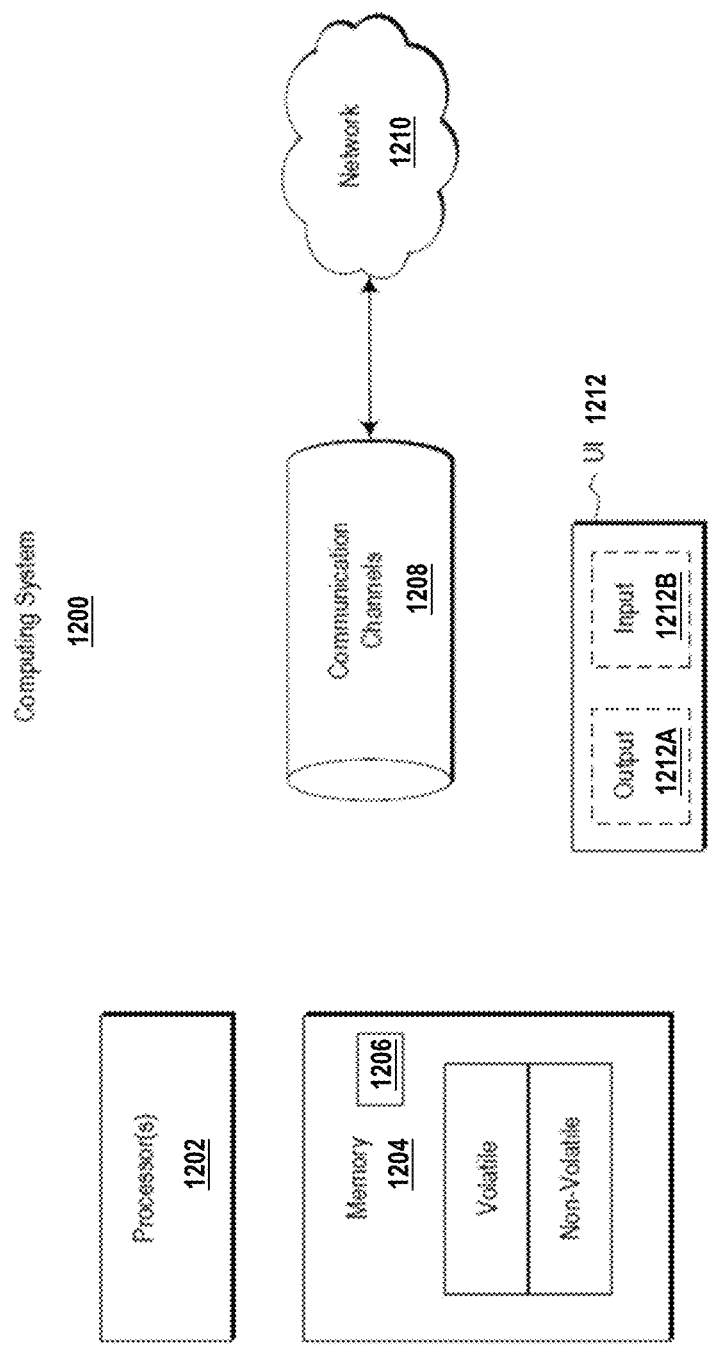
FIG. 12 illustrates an example of a computing system in which the principles described herein may be employed.

As illustrated in FIG. 12, in its most basic configuration, a computing system 1200 typically includes at least one hardware processing unit 1202 and memory 1204. The processing unit 1202 may include a general-purpose processor and may also include a field-programmable gate array (FPGA), an application-specific integrated circuit (ASIC), or any other specialized circuit. The memory 1204 may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well.

The computing system 1200 also has thereon multiple structures often referred to as an "executable component". For instance, memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hardwired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hardwired logic gates. The computer-executable instructions (and the manipulated data) may be stored in the memory 1204 of the computing system 1200. Computing system 1200 may also contain communication channels 1208 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B as such will depend on the nature of the device. However, output mechanisms 1212A might include, for instance, speakers, displays, tactile output, holograms, and so forth. Examples of input mechanisms 1212B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1200 previously described. The computing systems of the remaining figures include various components or functional blocks that may implement the various embodiments disclosed herein. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processor 1202 and memory 1204, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having stored thereon computer-executable instructions that are structured such that, when executed by the one or more processors, cause the computing system to:
generate a transformer-transducer-based deep neural network, the transformer-transducer-based deep neural network comprising a transformer encoder network and a transducer predictor network, and the transformer encoder network having a plurality of layers, each of the plurality of layers including a multi-head attention network sublayer and a feed-forward network sublayer;
train an end-to-end (E2E) automatic speech recognition (ASR) model, using the transformer-transducer-based deep neural network, the E2E ASR model being trained to have one or more adjustable hyperparameters that are configured to dynamically adjust an efficiency or a performance of the E2E ASR model when the E2E ASR model is deployed onto a device or executed by the device; and
provide the E2E ASR model to the device to be used to perform ASR in response to receiving a stream of speech.

2. The computing system of claim 1, the transducer predictor network comprising one or more long-short-term memory (LSTV) networks.

3. The computing system of claim 1, each of the multi-head attention network sublayer and the feed-forward network sublayer comprising a layer configured to perform a residual connection and a layer normalization.

4. The computing system of claim 1, the one or more adjustable hyperparameters includes at least one of:
(1) a number of layers that are to be implemented at the transformer encoder network,
(2) a history window size indicating a number of history frames that are to be considered by a frame of each layer,
(3) a look-ahead window size indicating a number of look ahead frames that are to be considered by a frame of each layer,
(4) a chunk size indicating a total number of frames that are to be considered by a frame of each layer,
(5) an attention mask indicating particular items in a frame index matrix that are to be set as "0", the frame index representing a particular configuration of the transformer encoder network, or
(6) a transducer path that is to be executed by the transducer predictor network.

5. The computing system of claim 4, the E2E ASR model configured to perform at least the following at the device:
identify one or more conditions of the device associated with computational power of the device, and
set at least one of the one or more adjustable hyperparameters based on one or more conditions of the device.

6. The computing system of claim 4, the E2E ASR model configured to perform at least the following at the device:
enumerate a plurality of paths in the transducer predictor network;
determine performance of each of the plurality of paths;
select a particular path among the plurality of paths that has a best performance; and
set the particular path as the transducer path.

7. The computing system of claim 5, setting the one or more adjustable hyperparameters comprising:
set a maximum chunk size, a maximum history window size, or a maximum look-ahead window size based on the one or more conditions of the device; and
generate the attention mask based on the maximum chunk size, the maximum history window size, or the maximum look-ahead window size.

8. The computing system of claim 7, wherein the one or more conditions of the device comprises at least one of following hardware conditions of the device (1) a type of processor that is installed on the device, (2) a number of processors that is installed on the device, (3) a type of memory that is installed on the device, or (4) a total amount of memory installed on the device.

9. The computing system of claim 8, wherein the one or more conditions of the device comprises at least one of following runtime conditions (1) a function of a particular application of the E2E ASR model that is executed by the device, or (2) a current status of the device.

10. The computing system of claim 9, the function of the particular application being at least one of (1) a streaming application configured to process a stream of speech in substantially real time, or (2) a post-processing application configured to process a file of a recorded speech.

11. The computing system of claim 10, wherein the current status of the device comprises at least one of (1) a thermal status of the device, (2) a throttling status of the device, (3) a status of other applications that are currently executing at the device, (4) a battery level of the device, or (5) a battery-saving status of the device.

12. A method for dynamically adjusting an automatic speech recognition (ASR) system based on one or more conditions of a device, comprising:
deploying an end-to-end (E2E) ASR model onto a device, the E2E ASR model being trained using a transformer-transducer-based deep neural network and having one or more adjustable hyperparameters;
determining one or more conditions of the device associated with computational power of the device;
setting at least one of the one or more adjustable hyperparameters based on the determined one or more conditions of the device associated with the computational power of the device; and
performing ASR using the ASR model in response to receiving a stream of speech.

13. The method of claim 12, wherein:
the E2E ASR model comprises a transformer encoder network and a transducer predictor network;
the transformer encoder network has a plurality of layers, each of which includes a multi-head attention network sublayer and a feed-forward network sublayer, and each of the multi-head attention network sublayer and the feed-forward network sublayer comprises a layer configured to perform a residual connection and a layer normalization.

14. The method of claim 13, the transducer predictor network comprising one or more long-short-term memory (LSTM) networks.

15. The method of claim 13, wherein the one or more adjustable hyperparameters comprising at least one of:
   (1) a number of layers that are to be implemented at the transformer encoder network,
   (2) a history window size indicating a number of history frames that are to be considered by a frame of each layer,
   (3) a look-ahead window size indicating a number of look ahead frames that are to be considered by a frame of each layer,
   (4) a chunk size indicating a total number of frames that are to be considered by a frame of each layer,
   (5) an attention mask indicating particular items in a frame index matrix that are to be set as "0", the frame index representing a particular configuration of the transformer encoder network, or
   (6) a transducer path that is to be executed by the transducer predictor network.

16. The method of claim 15, the setting of the transducer path comprising:
   enumerating a plurality of paths in the transducer predictor network;
   determining a performance of each of the plurality of paths;
   selecting a particular path among the plurality of paths that has a best performance; and
   setting the particular path as the transducer path.

17. The method of claim 12, wherein one or more conditions of the device comprises at least one of following hardware conditions: (1) a type of processor that is installed on the device, (2) a number of processors that is installed on the device, (3) a type of memory that is installed on the device, and/or (4) a total amount of memory that is installed on the device.

18. The method of claim 12, wherein the one or more conditions of the device comprises at least one of following runtime conditions: (1) a function of a particular application that employs the E2E ASR model on the device, or (2) a current status of the device.

19. The method of claim 18, wherein:
   the function of the particular application that employs the E2E ASR model is (1) a streaming application configured to process a stream of speech in substantially real time, or (2) a post-processing application configured to process a file of a recorded speech, and
   the current status of the device includes at least one of (1) a thermal status of the device, (2) a throttling status of the device, (3) a status of other applications that are currently executing at the device, (4) a battery level of the device, or (5) a battery-saving status of the device.

20. A computer program product comprising one or more hardware storage devices having stored thereon computer-executable instructions that are structured such that, when the computer-executable instructions are executed by one or more processors of a computing system, the computer-executable instructions cause the computing system to:
   generate an end-to-end (E2E) automatic speech recognition (ASR) model, the E2E ASR model being trained using a transformer-transducer-based deep neural network and having one or more adjustable hyperparameters;
   determine one or more conditions of the computing system associated with computational power of the computing system;
   setting at least one of the one or more adjustable hyperparameters based on the determined one or more conditions of the device associated with the computational power of the computing system; and
   perform ASR using the ASR model in response to receiving a stream of speech.

* * * * *